July 29, 1952  W. W. POINDEXTER  2,604,652
WINDSHIELD WIPER
Filed Jan. 27, 1950  2 SHEETS—SHEET 1
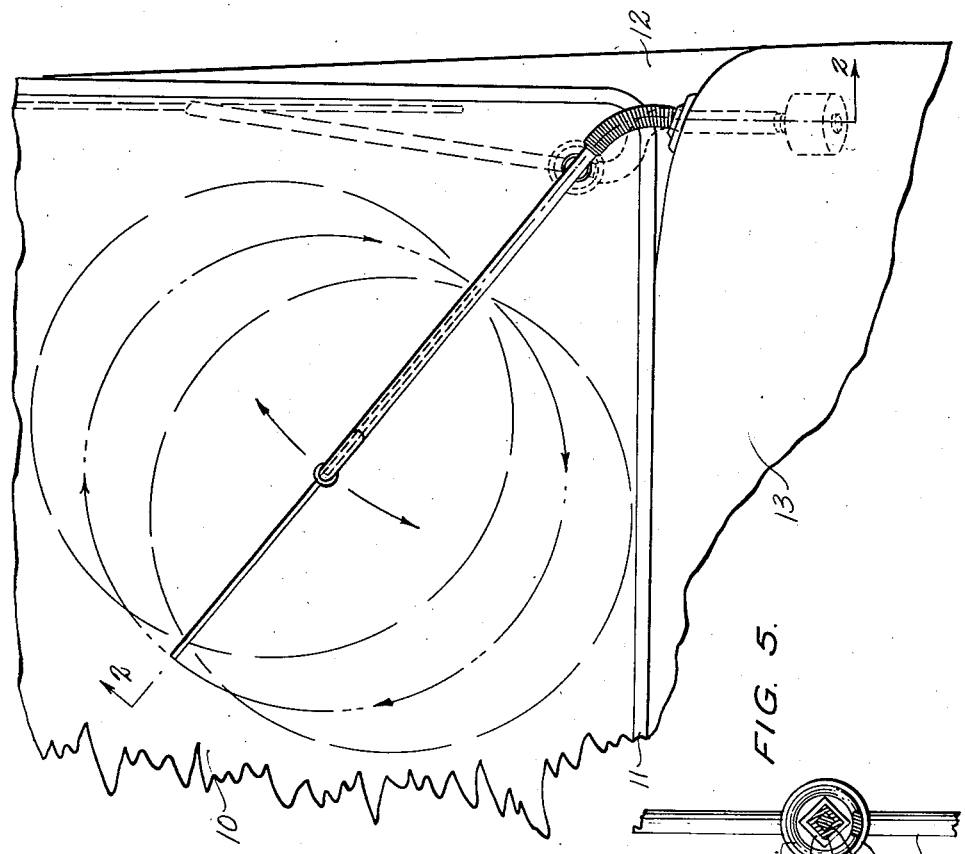
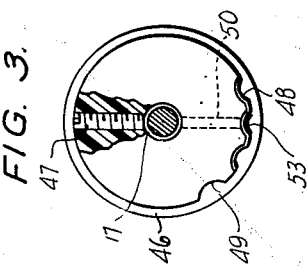
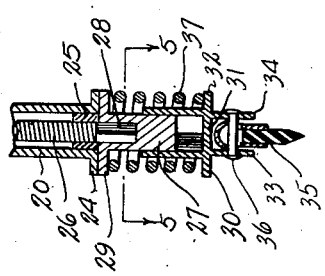
INVENTOR.
WILLIAM W. POINDEXTER,
BY
*McMorrow, Berman & Davidson*
ATTORNEYS.

INVENTOR.
WILLIAM W. POINDEXTER,
BY
McMorrow, Berman & Davidson
ATTORNEYS.

Patented July 29, 1952

2,604,652

UNITED STATES PATENT OFFICE 2,604,652

WINDSHIELD WIPER

William W. Poindexter, Hilton Village, Va., assignor to Frank H. Shaheen, Elizabeth City, Va.

Application January 27, 1950, Serial No. 140,868

3 Claims. (Cl. 15—254)

This invention relates to windshield wipers and more particularly to a rotatable windshield wiper which is movable between an inoperative and one or more operative positions.

It is among the objects of the invention to provide an improved windshield wiper in which the wiper blade is mounted for complete and continuous rotation and can be driven at a speed which renders it substantially invisible thus eliminating the annoying effects of the usual swinging or oscillating blade, which is so constructed that the blade and blade supporting arm can be moved to an inoperative position in which they are at one side of the windshield and out of the normal field of vision of a driver and to various operative positions within a predetermined range, which is automatically rendered inoperative when moved to the inoperative position, and which is simple and durable in construction, economical to manufacture, neat and attractive in appearance, and easy to install on a vehicle with no material modification of the vehicle construction.

Other objects and advantages will become apparent from a consideration of the following description and the appended claims in conjunction with the accompanying drawings, wherein:

Figure 1 is a front elevation of a fragmentary portion of an automobile windshield construction showing a windshield wiper illustrative of the invention operatively mounted thereon;

Figure 3 is a cross section on a somewhat enlarged scale on the line 3—3 of Figure 2;

Figure 4 is a cross section on an enlarged scale on the line 4—4 of Figure 2 showing a fragmentary portion of the wiper and illustrating a structural detail; and Figure 5 is a transverse cross section on the line 5—5 of Figure 4.

Figure 2:
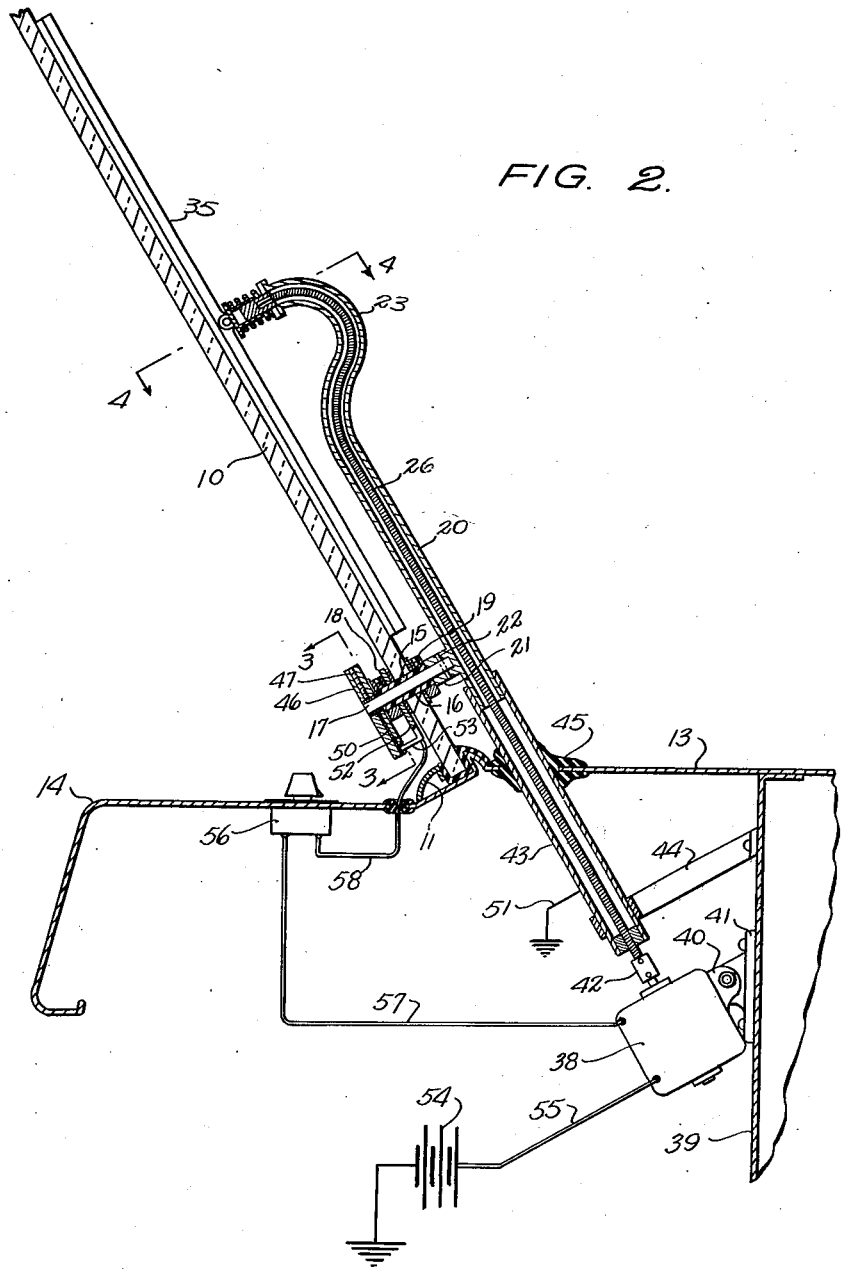
Figure 2 is a longitudinal cross section on the line 2—2 of Figure 1.

With continued reference to the drawings, there is illustrated in Figure 1 a fragmentary portion of an automobile windshield 10 mounted in a frame 11 and supported in a windshield opening in the front end of an automobile body 12 above the cowl 13 and the dash or instrument panel 14 of the automobile.

Near one lower corner the windshield 10 is provided with an aperture 15 and a sleeve 16 of electrically insulative material is mounted in this aperture and extends therethrough to opposite sides of the windshield 10. A shaft 17 is journaled in the sleeve 16 and the sleeve and shaft assembly are held against longitudinal movement through the aperture 15 by collars 18 and 19 secured on the sleeve at respective opposite sides of the windshield. These collars are releasably secured to the sleeve so that the shaft and sleeve assembly can be adjustably moved relative to the windshield to vary the pressure between the wiper and the windshield.

A hollow or tubular arm 20 is provided near one end with a laterally extending socket 21 which receives the end of the shaft 17 at the outer side of the windshield and the shaft is secured in this socket by suitable means such as the through pin 22. Near its opposite end the hollow arm 20 is provided with a goose neck 23 so that its end faces and is spaced from the outer surface of the windshield 10. This opposite end of the arm 20 is provided with an outwardly extending annular flange 24 and a bearing bushing 25 is secured in the arm at this opposite end thereof.

A flexible shaft 26 extends through the arm 20 and is journaled near one end in the bushing 25. A plug 27 of non-circular cross sectional shape is secured to this opposite end of the shaft by suitable means such as a squared end portion 28 of the shaft received in a complementary socket in the plug 27 and the plug is provided with an outwardly extending annular flange 29, the outer face of which bears against the adjacent face of the flange 24 on the arm 20 to provide a thrust bearing for the plug.

A hollow cap or sleeve 30, also of square or other non-circular cross sectional shape, slidably receives the plug 27 and has an end wall 31 closing one end wall which extends outwardly of the sleeve to provide a flange 32. Two apertured lugs 33 and 34 project outwardly from the end wall 31 in a direction away from the sleeve and a wiper blade 35 is received between these lugs and pivotally attached thereto by a through pin 36 which extends through registering apertures in the lugs and in the back of the wiper blade. A compression spring 37 surrounds the plug and the sleeve between the flanges 29 and 32 and resiliently forces the wiper blade 35 into contact with the outer surface of the windshield 10.

A small electric motor 38 is secured to the fire wall 39 of the automobile below the cowl 13 and instrument panel 14, this motor preferably being adjustably connected to the fire wall by a pivotal connection between a lug 40 on the motor and a bracket 41 attached to the fire wall of the vehicle. The flexible shaft 26 extends from the end of the arm 20 nearest the shaft 17 to the motor and is drivingly connected to the motor shaft by a suitable coupling 42.

A flexible casing 43 surrounds the flexible shaft 26 below the arm 20 and this casing is connected at its upper end to the lower end of the arm 20 and extends to a location adjacent the coupling 42 where it is secured in a bracket 44 mounted on the fire wall 39 of the vehicle. The cowl of the vehicle immediately ahead of the windshield is apertured for the flexible shaft and flexible casing to pass therethrough and the casing is sealed in this aperture by suitable means such as the rubber grommet 45.

With this arrangement, when the motor 38 is energized it will drive the flexible shaft 26 which will in turn rotate the wiper blade 35 about the rotational axis of the plug 27.

A hand knob 46 of some electrically insulative material, such as synthetic resin plastic, is secured on the end of the shaft 17 inwardly of the windshield by suitable means such as the set screw 47 extending through a radially disposed bore in the knob and engaging the shaft 17 at its inner end.

Near its outer circumference the knob 46 is provided with several notches, as particularly illustrated in Figure 3, there being four notches in the arrangement illustrated. A shoe 48 of electrically conductive material extends across three contiguous notches and the fourth notch 49 is electrically non-conductive. A conductor 50 connects the shoe 48 to the shaft 17 and this shaft is grounded through the arm 20 and flexible casing 43 as indicated at 51 in Figure 2. An L-shaped spring contact 52 has an aperture near one end which receives the insulating sleeve 16 between the windshield 10 and the collar 18 and the arm 53 of this spring contact engages in the notches provided in the hand knob 46. When the spring contact engages the shoe 48 it will be grounded in the manner indicated above but when it is in the notch 49 no electrical circuit can be completed to ground through this contact.

The notches covered by the shoe 48 correspond to three different operative positions of the wiper while the notch 49 corresponds to an inoperative position of the wiper in which position the wiper is disposed at the adjacent end of the windshield, as indicated in broken lines in Figure 1, and out of the normal field of vision of a driver of the vehicle.

The wiper blade is moved to its various operative and inoperative positions by rotating the shaft 17 by means of the knob 46 which rotation of the shaft swings the arm 20 about the rotational axis of the shaft, as is clearly indicated in Figure 1.

An energizing circuit for the motor 38 is provided and comprises a source of electrical energy, such as the battery 54 grounded at one side, a conductor 55 leading from the opposite side of the battery to the motor, a manually adjustable motor speed controlling device 56 mounted on the instrument panel 14 of the vehicle, a conductor 57 leading from the motor to this speed controlling device and a conductor 58 leading from the speed controlling device to the spring contact member 52. The speed controlling device is effective to interrupt the motor energizing circuit as well as to control the speed of the motor and the knob 46 and spring contact 52 cooperate to interrupt the motor energizing circuit whenever the wiper is moved to its inoperative position.

The wiper blade 35 will normally be rotated at a speed such that it is not visible to the driver of the vehicle and hence has no annoying effects on the driver's vision. This speed can be further increased in order to keep the windshield clear of snow or of water during an exceptionally hard rain and the position of the wiper when in operation, can be changed sufficiently to accommodate the wiper to drivers of different height.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A windshield wiper comprising a manually rotatable shaft extendable through a vehicle windshield, a hollow arm secured near one end to said shaft at the outer side of the windshield, a flexible shaft extending through said arm and journaled near one end in said arm at the opposite end of the latter, a wiper blade, a resiliently expansible driving connection between said one end of said flexible shaft and said wiper blade for rotating said blade while exerting windshield engaging pressure thereon, a motor drivingly connected to the opposite end of said flexible shaft, a flexible casing surrounding said flexible shaft between said hollow arm and said motor, a knob secured on said manually rotatable shaft for moving said arm and said blade between their operative and inoperative positions, contact means operated by said knob to be opened when said arm and blade are in their inoperative position and closed when said arm and blade are in any operative position, and an energizing circuit for said motor including in series said contact means and a motor speed control device, said contact means comprising a spring contact supported on said shaft and selectively engageable in notches provided in said knob to resiliently retain said arm and blade in any operative or inoperative position, electrically conductive means in said notches except the notch corresponding to the inoperative position of said arm and blade, and means electrically grounding said electrically conductive means.

2. In combination with vehicle structure including a cowl, a fire wall within and at the front end of said cowl, an instrument panel extending rearwardly from the rear edge of said cowl and a windshield extending upwardly and rearwardly from the rear edge of said cowl, said windshield having an aperture therethrough near one lower corner thereof and said cowl having an opening therethrough adjacent the aperture in said windshield, a windshield wiper comprising a shaft extending through and journaled in the aperture in said windshield, a hollow arm secured near one end to the end of said shaft at the outer side of the windshield and disposed substantially parallel to the windshield, said arm having at its other end a gooseneck formation disposing said other end in opposition to the outer surface of the windshield, a flexible casing secured at one end to said arm at said one end of the latter and extending through the opening in said cowl to a location adjacent said fire wall, a first bracket connecting the other end of said casing to said fire wall, a second bracket mounted on said fire wall below said first bracket, an electric motor adjustably mounted on said second bracket and having its shaft in alignment with said other end of said casing, a flexible shaft extending through said tubular arm and said casing and connected at one end to the adjacent end of said motor shaft, a wiper blade disposed between said other end of arm and the windshield, means drivingly connecting the other end of said flexible shaft to said wiper blade, spring means disposed between said wiper blade and said other end of the arm resiliently pressing said wiper blade against said windshield, a knob secured to said shaft at the inner side of said windshield for swinging said arm between an operative and an inoperative position for the wiper, switch means actuated by said knob to open condition when said arm is in inoperative position and to closed condition when said arm is in operative position, an electrical conductor connected to said motor and including said switch means, and a manually operated motor speed controlling device mounted on said instrument panel and interposed in said electrical conductor in series with said switch means.

3. In combination with vehicle structure including a cowl, a fire wall within and at the front end of said cowl, an instrument panel extending rearwardly from the rear edge of said cowl and a windshield extending upwardly and rearwardly from the rear edge of said cowl, said windshield having an aperture therethrough near one lower corner thereof and said cowl having an opening therethrough adjacent the aperture in said windshield, a windshield wiper comprising a shaft extending through and journaled in the aperture in said windshield, a hollow arm secured near one end to the end of said shaft at the outer side of the windshield and disposed substantially parallel to the windshield, said arm having at its other end a gooseneck formation disposing said other end in opposition to the outer surface of the windshield, a flexible casing secured at one end to said arm at said one end of the latter and extending through the opening in said cowl to a location adjacent said fire wall, a first bracket connecting the other end of said casing to said fire wall, a second bracket mounted on said fire wall below said first bracket, an electric motor adjustably mounted on said second bracket and having its shaft in alignment with said other end of said casing, a flexible shaft extending throug said tubular arm and said casing and connected at one end to the adjacent end of said motor shaft, a wiper blade disposed between said other end of said arm and the windshield, means drivingly connecting the other end of said flexible shaft to said wiper blade, spring means disposed between said wiper blade and said other end of the arm resiliently pressing said wiper blade against said windshield, a knob secured to said shaft at the inner side of said windshield for swinging said arm between an operative and an inoperative position for the wiper, switch means actuated by said knob to open condition when said arm is in inoperative position and to closed condition when said arm is in operative position, an electrical conductor connected to said motor and including said switch means, and a manually operated motor speed controlling device mounted on said instrument panel and interposed in said electrical conductor in series with said switch means, said switch means comprising a spring contact supported on said shaft and selectively engageable in notches provided in said knob to resiliently retain said arm and blade in selected operative or inoperative positions, electrically conductive means in said notches except the notch corresponding to the inoperative position of said arm, and means electrically grounding said electrically conductive means.

WILLIAM W. POINDEXTER.

REFERENCES CITED

The following references are of record in the file of this patent:

UNITED STATES PATENTS

| Number | Name | Date |
|---|---|---|
| 1,895,273 | Wolf | Jan. 24, 1933 |
| 1,944,260 | Meyers | Jan. 23, 1934 |
| 2,239,754 | Marti | Apr. 29, 1941 |

FOREIGN PATENTS

| Number | Country | Date |
|---|---|---|
| 314,115 | Germany | June 24, 1929 |
| 357,063 | Great Britain | Sept. 17, 1931 |